United States Patent
Boteanu et al.

(10) Patent No.: US 11,443,180 B1
(45) Date of Patent: Sep. 13, 2022

(54) MAPPING CONTENT TO AN ITEM REPOSITORY

(71) Applicant: A9.com, Inc., Palo Alto, CA (US)

(72) Inventors: Adrian Boteanu, Somerville, MA (US);
Shay Artzi, Brookline, MA (US);
Adam Kiezun, Belmont, MA (US);
Raju Matta, Needham, MA (US)

(73) Assignee: A9.COM, INC., Palo Alto, CA (US)

(*) Notice: Subject to any disclaimer, the term of this patent is extended or adjusted under 35 U.S.C. 154(b) by 1127 days.

(21) Appl. No.: 15/994,274

(22) Filed: May 31, 2018

(51) Int. Cl.
*G06N 3/08* (2006.01)
*G06Q 30/06* (2012.01)
*G06Q 30/02* (2012.01)

(52) U.S. Cl.
CPC ........... *G06N 3/08* (2013.01); *G06Q 30/0631* (2013.01); *G06Q 30/0282* (2013.01)

(58) Field of Classification Search
CPC ... G06N 3/08; G06Q 30/0631; G06Q 30/0282
See application file for complete search history.

(56) References Cited

U.S. PATENT DOCUMENTS

| 8,909,583 | B2* | 12/2014 | Wilson | G06N 5/022 |
| | | | | 706/46 |
| 2012/0323725 | A1* | 12/2012 | Johnston | G06Q 30/02 |
| | | | | 705/26.7 |
| 2014/0358720 | A1* | 12/2014 | Morales | G06Q 30/0631 |
| | | | | 705/26.7 |

* cited by examiner

Primary Examiner — Alexandru Cirnu
(74) Attorney, Agent, or Firm — Hogan Lovells US LLP

(57) ABSTRACT

Various embodiments of systems and methods for mapping review articles to locations in a marketplace catalog. Various embodiments include training a system using product reviews and images from the marketplace as training data. Product reviews and images can be provided to autoencoders to generate respective short codes. The product review short codes can be combined with the product image short codes to generate review short codes. These review short codes can be provided as training data for an attribute assignment network while associated attributes (e.g., attributes associated with related products) can be target outputs for the attribute assignment network. After the system is sufficiently trained, a review article can be obtained from the publishing platform. This review article can be provided to the trained system to receive predicted attribute assignments. These predicted attribute assignments can be effective to map the review article to locations in a marketplace catalog.

20 Claims, 7 Drawing Sheets

MAPPING CONTENT TO AN ITEM REPOSITORY

BACKGROUND

People increasingly rely on reviews of items to inform their purchasing decisions. Reviews typically come from anonymous users on a marketplace are directed to specific individual products or services. These reviews can be helpful to inform a customer about certain characteristics of a product, but are generally lacking when the customer wants guidance from a known reviewer to help the customer choose between multiple products or when the customer wants general guidance when making their purchasing decision.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to map content items to an item repository. In particular, various embodiments include training a system using customer-product reviews and images from the marketplace as training data. Product reviews and images can be provided to autoencoders to generate respective short codes. The product review short codes can be combined with the product image short codes to generate review short codes. These review short codes can be provided as training data for an attribute assignment network while associated attributes (e.g., attributes associated with related products) can be target outputs for the attribute assignment network. After the system is sufficiently trained, a review article can be obtained from the publishing platform. This review article can be provided to the trained system to receive predicted attribute assignments. These predicted attribute assignments can be effective to map the review article to locations in a marketplace catalog. An attribute can be a location in a catalog of the marketplace and when a customer goes to that location (e.g., request a website for that location), a relevant review article can be provided to the customer. In this way, review articles can be provided at relevant locations in the marketplace catalog without manually labeling or tagging the review articles, using customer-product reviews and images on the marketplace as training data.

Various other functions and advantages are described and suggested below as may be provided in accordance with the various embodiments.

Figure 1A:
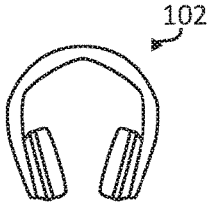
FIGS. 1A, 1B, and 1C illustrate an example process for mapping third party content to an item repository according to some embodiments.
Figure 1B:
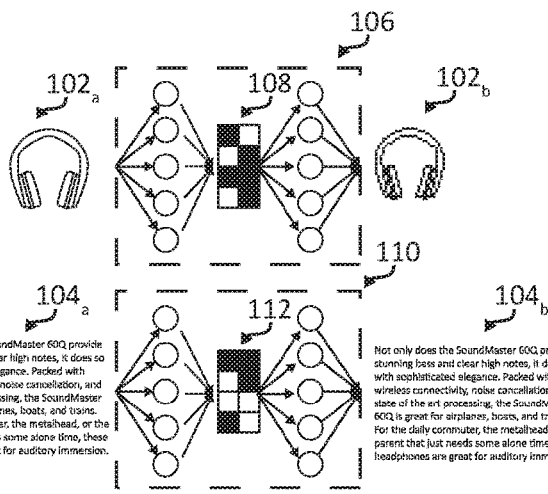
Figure 1C:
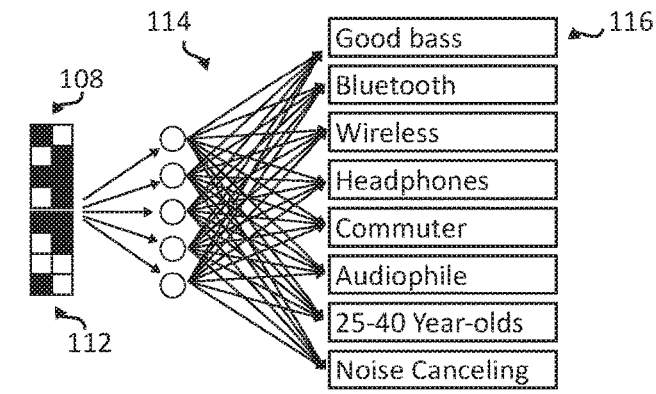

FIGS. 1A, 1B, and 1C illustrate an example process for mapping review articles from a review publisher to a marketplace catalog. FIG. 1A shows a review article 100 from a review publisher for choosing the best headphones for movies. The review article 100 can include a review image 102 of a product and a detailed analysis of a product including a review text portion 104.

A review article 100 can include multiple components such as images 102, text 104, a title, headings, captions, labels (e.g., "hashtags"), comments, review scores, authors (including profile characteristics such as a background, specialty, age, location, language, etc. of an author), a level of expertise for the review (e.g., for professionals, "prosumers," amateurs, etc.), a targeted audience for the review, a date of publication, a date of last update, an authenticity metric (e.g., whether the reviewer received compensation for the review, a free product, etc.), a version of the product (e.g., was it a pre-release review, a launch-day review, a review of current rumors and not a product, etc.), a "share" count (e.g., how many times the article has been shared via email or on social networks), a reference count (e.g., how many times the article has been referred to by other articles), etc. It should be understood that a review article 100 as used herein should not be limited to a review of a product for purchase. A review article 100 can be a buying guide that teachers a reader how to make a decision without referencing specific products, a news article discussing the dangers of a certain type of product, or a technical overview of certain technologies relevant to a class of products (e.g., an article describing the difference between LCD, LED, and OLED televisions). A review article 100 can also be a blog post, a syndicated column, a video review, official documentation, an advertisement, a newspaper article, a how-to guide, social media comment, etc.

A "product" as used herein can include an item or service, physical or digital, that can be consumed (e.g., purchased, rented, leased, borrowed, downloaded, viewed, etc.). For example, a product can include a music track, a digital movie rental, a subscription to a streaming service, a house-cleaning service, a consumer good, a grocery item, etc. The product can be provided (e.g., sold) by the marketplace or by a third party seller.

In some embodiments, a review article 100 can include multiple sub reviews, such as a review article 100 reviewing the top three headphones. This type of review can be analyzed for the purposes herein as a single review article 100 or can be broken up (e.g., for each product or topic reviewed) into separate review articles 100 as a pre-processing step. For example, a system can find headers in the review article 100 indicating separate sections of the review article 100 and segment the review article 100 accordingly.

The review article 100 might be tagged with keywords such as "gift ideas," "airplane," "professional," etc. or might be otherwise labeled or organized according to a scheme specific to the review publisher. For example, the review publisher might have sections of a web site dedicated to certain audiences e.g., kids, teens, parents, adults, etc. An author of a review article can supply keywords for the article 100; alternatively or additionally a publisher can supply keywords for the review article 100. These organizational paradigms might be useful for a patron of the review publisher but might not correspond to an organizational scheme of an online marketplace. Therefore, it can be difficult to map review articles to the organization scheme of the online marketplace. The techniques described herein can be especially useful when a review article 100 is applicable to a class of products and not just an individual product.

FIG. 1B shows an image autoencoder 106 and a text autoencoder 110. In FIG. 1B, the image autoencoder 106 and the text autoencoder 110 have already been satisfactorily trained. An autoencoder is a form of neural network that can comprise two similar sections, an encode section that converts an input to a short code and a decode section that converts a short code to an output. By constraining the short code to hold a limited amount a data and by training the autoencoder to minimize the difference between the output and the input, a trained autoencoder can effectively separate useful and descriptive features of an input from generic features of the input. The descriptive features are generally captured in the short code while the generic aspects are captured in the rest of the neural network while overly specific features (e.g., noise) are not captured. In some autoencoders, the encode portion (i.e., the nodes and connections of the input to the short code) can be a mirror image of the decode portion (i.e., the nodes and connections of the short code to the input). An autoencoder can be modified and combined with other autoencoders. The center part of the autoencoder can be a limited set of neurons whose values can be extracted as a feature vector, described herein as a short code. In some embodiments, a single autoencoder is utilized instead of separate text autoencoder 110 and image autoencoder 108; for example, a single convolutional autoencoder can receive as inputs a fixed resolution image (e.g., after resizing if necessary) and a fixed size text representation (e.g., a count of words in the review article text) and generate a single short code representation.

An image autoencoder 106 can receive the review image $102_a$ as input and generate an image short code 108. The image short code 108 can capture unique features of the review image 102. That is, unique features relative to other images provided to the image autoencoder 106. The image autoencoder 106 can be trained on images from a marketplace, such as official product images, user supplied images for products, or images of products elsewhere. The image autoencoder 106 can be trained using review images from a review publisher. In some embodiments, certain images can be used to only train the image autoencoder 106, for example product images from a third party database. In some embodiments, the image autoencoder 106 is static once trained and does not adapt to new inputs. Alternatively, the trained image autoencoder 106 can further "learn" (e.g., adjust weights and metrics within the neural network to minimize an error term) from review image $102_a$ by attempting to minimize the difference between the output image $102_b$ and the review image $102_a$.

A trained text autoencoder 110 can receive review text portion $104_a$ and generate a review text portion short code 112. The trained text autoencoder 110 can be trained using customer-product reviews on a marketplace. The trained text autoencoder 110 can be trained using text portions from the review publisher. Similar to trained image autoencoder 106, the trained text autoencoder 110 can continue to "learn" and attempt to minimize the difference between an output text portion $104_b$ and the review text portion $104_a$.

Converting the review image 102 and review text portion 104 to short codes can compress the data so that only information that describes important features is retained. These compressed short codes, having less data, can be efficient inputs in a neural network. The combination of the review image short code 108 and the review text portion short code 112 can be provided to another autoencoder to form a short code representing the entire review article (i.e., the image and the text portion), as detailed elsewhere herein.

FIG. 1C illustrate an example trained assignment network 114 that takes the review image short code 108 and the review text portion short code 112 as an input and identifies related attributes 116. These attributes 116 can correspond to a catalog on the marketplace. For example, a marketplace catalog might include a tree hierarchy of products such that the path from a root node to an example product could be "root→electronics→audio→portable audio→headphones-→over-the-ear→noise cancelling→SoundMaster 60Q→black." Each node in the marketplace catalog can be an attribute of attributes 116 for the trained assignment network 114. When the related attributes 116 are identified, they can then be associated with the review article 100.

By using autoencoders to compress a review article 100 into short codes and using the short codes as an input to a trained assignment network 114, review articles 100 can be intelligently associated with attributes 116 in a marketplace catalog; for example, they can be mapped to locations in the marketplace catalog. After such an association, when data for a location in the marketplace catalog is requested, a review article that is relevant to that location can be identified using the assigned attributes 116. Thus, when a customer of the marketplace browses to a certain location within the catalog, relevant review articles can be presented from the review publisher to inform the customer's decision at that point in the catalog. For example, if a customer is at a "portable audio" section of the catalog, a relevant review article might inform a decision of whether to purchase a portable speaker or headphones (e.g., which type of product is better for certain activities).

Figure 2A:
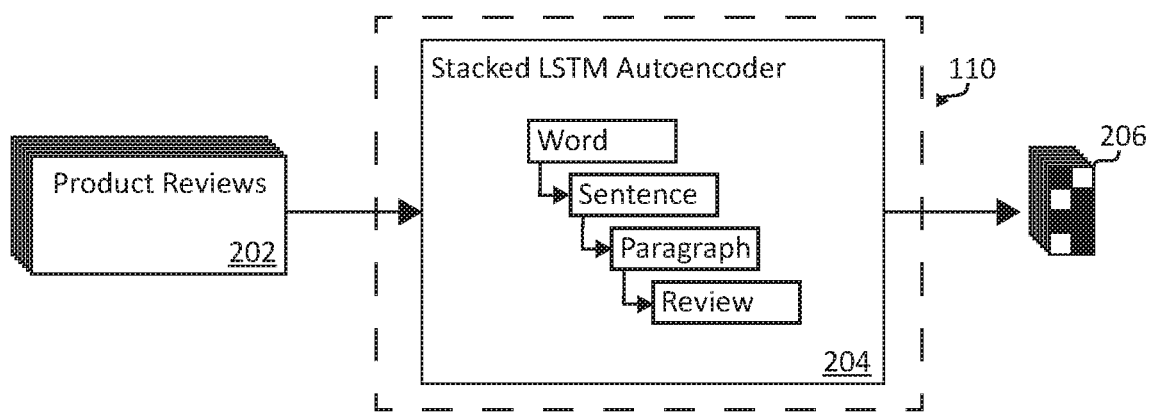
FIGS. 2A, 2B, and 2C illustrate example techniques for training autoencoders according to various embodiments.
Figure 2B:
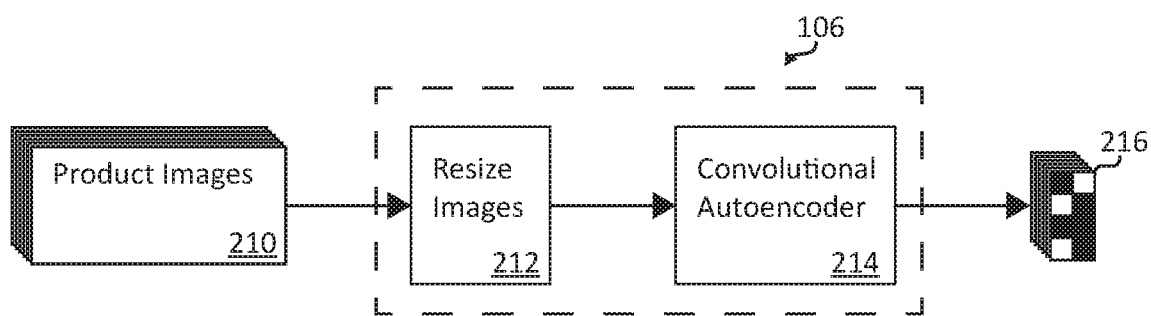
Figure 2C:
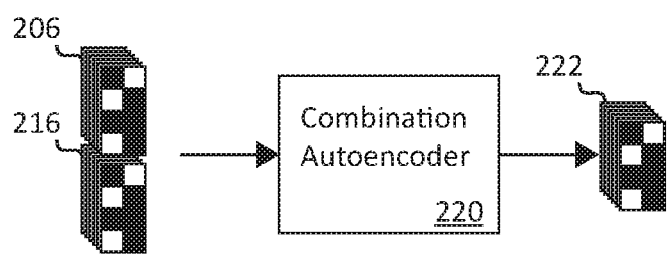

FIGS. 2A, 2B, and 2C show example techniques for training autoencoders according to various embodiments. In FIG. 2A, a text autoencoder 110 (e.g., text autoencoder 110 from FIG. 1B) can receive customer-product reviews 202 from the marketplace and generate text short codes 206. The product reviews 202 can be customer-provided reviews for specific products on the marketplace in contrast to review articles 100 which come from a publishing platform.

A customer-product review can be associated with a variety of attributes. These attributes can pertain to products, nodes in a catalog of a marketplace, labels, target audiences, reviewer attributes (e.g., an age, experience level, time using the related product, and whether the reviewer is a verified purchaser), etc. A product review can be associated with a specific product (e.g., stock keeping unit or "SKU") and that specific product (e.g., location in the catalog) can be an attribute of the product review. Alternatively or additionally, a product review can be associated with a product model, series, brand, seller, category, etc. each of which can be included as attributes of the product review.

A product review can include a title, text portion, and a rating for the product. In some embodiments, only the text portion or the text portion concatenated with the title is retained. In some embodiments, the rating can be converted to text (e.g., "four stars") and added to the text portion. Product reviews 202 can be filtered by date such that only recent reviews are retained. In some embodiments, product reviews 202 can include specifications of products and/or technical descriptions. The product reviews 202 can be filtered before being passed to autoencoder 110. For example, low-quality reviews such as those with poor grammar or spelling, those less than a certain length, or those that have been deemed unhelpful by others can be removed.

The product reviews 202 can be provided to a text autoencoder 110. The text autoencoder 110 can include a stack of long short-term memory ("LSTM") encoders. For example, a sentence LSTM layer can analyze the words in each sentence and can generate a corresponding sentence short code. A paragraph LSTM layer can then analyze the sentence short codes for each paragraph and generate a corresponding paragraph short code. A review text LSTM layer can then analyze the paragraph short codes for each review and generate a corresponding review text short code 206. Not all layers are required, for example, an LSTM layer can analyze all the words in the product review to generate a product review short code.

In some embodiments, the intermediate short codes (e.g., sentence short codes, paragraph short codes, and review text short codes) can be the same size. Alternatively, they can be different sizes; for example the review text short code 206 can be larger than the paragraph short code which can be larger than the sentence short code. This can be useful if the review article as a whole describes more features than any single sentence or paragraph. Alternatively, short code sizes can be largest for the sentence short codes and paragraph and review short codes can be progressively smaller. This can be useful to have the "compression" through each layer be gradually increased. The "size" of the short code can be any combination of: the number of "neurons" making up the short code, a number of possible values for the neurons (e.g., if a neuron can only be −1, −0.5, 0, 0.5, and 1, then the neuron could have a size of 5), and a sparsity restriction on the short code (e.g., that all neurons must be empty or zero except one). In other words, the size of a short code can be the total possible amount of information contained within the short code.

In some embodiments, the text autoencoder 110 can include a convolutional autoencoder. For example, the text autoencoder 100 can preprocess a customer-product review 202 to remove common words (e.g., "and," "the," "I," etc.). A preprocessor can then count the occurrences of various words (or groupings of words) in a predefined index (e.g., a list of all possible words or word groupings). The counts of the words can then be used as inputs to a convolutional autoencoder. Other techniques for using a convolutional text autoencoder are contemplated.

FIG. 2B shows how product images 210 can be provided to image autoencoder 106 to generate image short codes 216. The product images 210 can include images from official sources such as a manufacturer. The product images 210 can include images from customers (e.g., with a product review). The product images 210 can include images from a third party database. In some embodiments, some of the product images 210 are only used to train the image autoencoder 106 but are otherwise unused. As with the product reviews 202, the product images 210 can be associated with a variety of attributes pertaining to a product, a node of a marketplace catalog, a model, brand, or seller, etc.

The image autoencoder 106 can preprocess the product images 210. For example, the image autoencoder 106 can filter the product images 210 to remove low-quality images (e.g., those that are too dark, too noisy, lack features, etc.). The image autoencoder 106 can apply a filter to the product images 210 such as a high-pass filter, a low pass filter, color filters, etc. The image autoencoder 106 can additionally or alternatively use other pre-processing techniques such as image segmentation and/or edge detection. The image autoencoder 106 can resize the images 212 to a standardized size such as 256 by 256 pixels. The image autoencoder 106 can reduce the bit depth of the review images 210. In some embodiments, a product image can include multiple views of a product; the image autoencoder 106 can isolate the individual views into separate product images for analysis. For example, a product image might have multiple views of the product, each view corresponding to a different color of the product. The image autoencoder 106 can determine (e.g., through image segmentation) that it can split up the product image into multiple product images.

The preprocessed product images can then be passed to a convolutional autoencoder 214 to generate image short codes 216.

FIG. 2C shows an example combination autoencoder 220. The combination autoencoder 220 can obtain the text short codes 206 and the image short codes 216 and generate review short codes 222. The combination autoencoder can be a convolutional autoencoder. In some embodiments, the combined size of text short codes 206 (e.g., the vector size) and of images short codes 216 (e.g., the vector size) is larger than the review short codes 220. That is to say, a review short code can identify important features from a text short code and an image short code while removing redundancies. When the text and image short codes have similar features (e.g., they both pertain to over ear headphones), then a small review short code is able to describe features in both the text short code and image short code. After sufficiently training the combination autoencoder, if the error between the recreated text short code/image short code combination and their original inputs is above a certain threshold, the system can determine that the match between the specific text short code and image short code is sub-optimal and the pair can be discarded. Thus, the combination autoencoder 220 can validate matchings of product reviews and product images.

Although two inputs (or "components") are presented in FIGS. 2A-2C (i.e., product reviews 202 and product images 210), more or fewer components are contemplated. For example, review videos can be supplied to a convolutional autoencoder (for each image) stacked with a LSTM autoencoder for the sequence of image and audio to generate video short codes. Additionally, review titles, review ratings, customer-supplied tags, audio reviews, product category codes, contributor characteristics (e.g., age, experience level, etc.) etc. can serve as inputs to respective autoencoders. The results of the various autoencoders such as text autoencoder 110, image autoencoder 106, and other autoencoders not depicted (e.g., video autoencoder, title autoencoder, etc.) can be provided in sets to a combination autoencoder 220 to generate review short code 222. In some embodiments, raw data can be concatenated with a short code and supplied to combination autoencoder 220. For example, a product category code (e.g., electronics, cosmetics, etc.) can be concatenated with a text short code 206 and an image short code 216 and supplied to combination autoencoder 220. In some embodiments, the combination autoencoder 220 is not utilized and the different short codes (e.g., text short code 206 and image short code 216) are concatenated to generate review short code 222. The review short code 222 would thus have a size equal to the combined sizes of the text short code 206 and the image short code 216.

In some embodiments, each product review is associated with a product image (e.g., if a customer leaves a review and a picture with their review) and the corresponding short codes can be presented to the combination autoencoder 220 jointly. Additionally or alternatively, product images 210 can be matched with product reviews 202 based on their associated attributes. For example, if a product image and a product review are for the same product or SKU then they can be matched together. A single product image can be matched with multiple product reviews and can thus be provided to the combination autoencoder 220 multiple times, once for each matching. Similarly, a single product review can be matched with multiple product images and can be provided to the combination autoencoder 220 multiple times, once for each matching. The system can generate matchings of product reviews with product images until the various autoencoders are sufficiently trained. This matching technique can be applied to situations where there are more than 2 components, e.g., where a product review is matched with a product image and a contributing profile.

Figure 3:
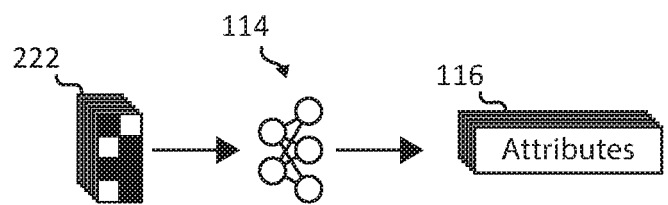
FIG. 3 illustrate an example technique for training an assignment network by providing review short codes and assigning attributes to the review short codes according to some embodiments.

FIG. 3 shows an example technique for training an assignment network 114 by providing review short codes 222 and assigning attributes 116 to the review short codes 222. Assignment network 114 can be a feed forward neural network. The attributes 116 can be derived from, or otherwise associated with, the respective product reviews 202 and product images 210 that were used to generate the respective review short codes 222. For example, a product review and product image of a certain model of headphones can be supplied to an autoencoder system to generate a review short code for that product review and product image. The short code can thus be associated with various attributes derived from the product review and image (e.g., the product's location in a marketplace catalog). These review short codes 222 and their respective attributes 116 can be used to train the assignment network 114 so that the assignment network 114 accurately assigns, or "predicts," the appropriate attributes 116 to each review short code 222. In some embodiments, a product review references another product (e.g., "these headphones are not as good as the Soundmasters") and can be associated with the referenced product and referenced product's attributes. A product review and product image can inherit attributes of related products. For example, a product might have seller-provided attributes and the related reviews and images can inherit those seller-provided attributes.

When components are matched together, the resulting grouping can have attributes that are only those shared between the components. For example, if a product image of red headphones is matched with a product review of the blue version of the headphones, then the respective "red" and "blue" attributes can be discarded. Discarded attributes, when used for training can be ignored such that a training system does not attempt to minimize an error term for the discarded attributes for that matching.

The preparatory process outlined in FIGS. 2A, 2B, 2C, and 3 can be effective to train an attribute assignment system (e.g., comprising autoencoders 110, 106, 220 and assignment network 114) to assign attributes 116 to the combination of a product review and product image from a marketplace. Although the product reviews 202 and product images 210 from the marketplace might have a different structure or form that review articles from a review publisher, the product reviews 202 and product images 210 are sufficient to train the attribute assignment system to identify relevant features of text and images for the purposes of selecting attributes 116. For example, a "thin and light" category of laptops on the marketplace might have reviews for various laptops that discuss school (e.g., "I got this for my daughter for school . . . "). The attribute assignment system can determine that discussion in the text of "school" maps to the thin and light category of laptops. Thus, when a review article is received from a publisher that mentions "school," the attribute assignment system can determine that the review article may be relevant to the thin and light category. Because of the complexity of artificial neural networks, the hidden layer of neurons and connections is typically opaque to human understanding and need not correspond to such concrete concepts as "school" mapping to a certain product category, but such an example is effective for illustrative purposes.

Returning to FIGS. 1A-1C, once the attribute assignment system is trained, a review article 100 can be presented to the trained text autoencoder 110 and a trained image autoencoder 106 to generate review text portion short code 112 and review image short code 108. These codes can be concatenated (e.g., FIG. 1C) or otherwise combined (e.g., combination autoencoder 220) and the combination can be supplied to the assignment network 114 to assign attributes 116 of the marketplace catalog. These assigned attributes can be associated with the review article 100. A system can then create a database of mappings for attributes and review articles 100.

A database of attributes and review articles can be used for a variety of purposes. For example, a customer on a marketplace can enter a search, the search can correspond to certain attributes (e.g., through a text comparison or natural language processing); the marketplace can then suggest an article that most closely matches the attributes for the search. For example, if a customer searches for "good headphones for a plane trip," then the system can determine that the search corresponds to an attribute of "noise cancelling headphones" and can further determine that a review article titled "great headphones for commuting" is most appropriate for the attribute (and the search). Similarly, when a customer browses to a certain location in a catalog (e.g., a node for "headphones") of a marketplace, then the customer can be presented with the appropriate review article that most closely aligns with the attribute of the location of the catalog. In some embodiments, a reader of a review article may wish to go to the marketplace catalog; the principles herein can enable the reader to navigate to a relevant location in the marketplace catalog based on the review article and its assigned attributes. In this way, a reader would not necessarily go to a specific marketplace item, but perhaps a category page where the reader could then read other relevant review articles. In some embodiments, review articles can be matched to review articles that have the same assigned attributes so that a link can be provided to learn more about the topic on another review article that might be on another publishing platform.

In some embodiments, attributes 116 can pertain to characteristics of profiles. For example, product reviews 202 can be associated with the profiles of the customers that wrote the reviews. The attribute assignment system can then be trained to assign profile characteristics to review articles. This can help identify review articles written towards a certain audience (e.g., by topic, diction, or syntax) and assign attributes as appropriate, including other attributes as described herein (e.g., attributes pertaining to the marketplace catalog). Thus, when a customer with a profile on the marketplace goes to a certain section of the catalog, the system can identify the attributes for that section as well as attributes for the profile of the customer (e.g., age, interests, region, past purchases, etc.) and suggest the most relevant review article based on those attributes.

It should be understood that various systems need not be static once trained. For example, autoencoders 110, 106, and 220 can be "unsupervised" meaning they do not require labeled data sets and thus they do not require a special training data set. Therefore, autoencoders 110, 106, and 220 can continue to "learn" while processing review articles and review images from a review publisher or other sources. Thus, designating certain neural networks as "trained" can imply that the neural network has been sufficiently trained to achieve satisfactory results, but can still "learn" from new data.

In some embodiments, each autoencoding layer is ignorant of later states of the assignment process. For example, a sentence autoencoder receives no feedback from later layers of text autoencoder 110 and receives no feedback from assignment network 114. Alternatively, later layers can provide feedback to earlier layers. For example, assignment network 114 can determine that a data point in review short code 222 has little predictive value in assignment network 114. The assignment network 114 can then inform combination autoencoder 220 that the data point (which likely corresponds to a node in autoencoder 220) can be removed. The assignment network 114 can determine that the review short codes 222 have too little data to accurately make assignments; the assignment network 114 can then inform the combination autoencoder 220 to increase its short code vector by adding a node. Autoencoders can request that other autoencoders similarly increase their vector sizes.

Figure 4:
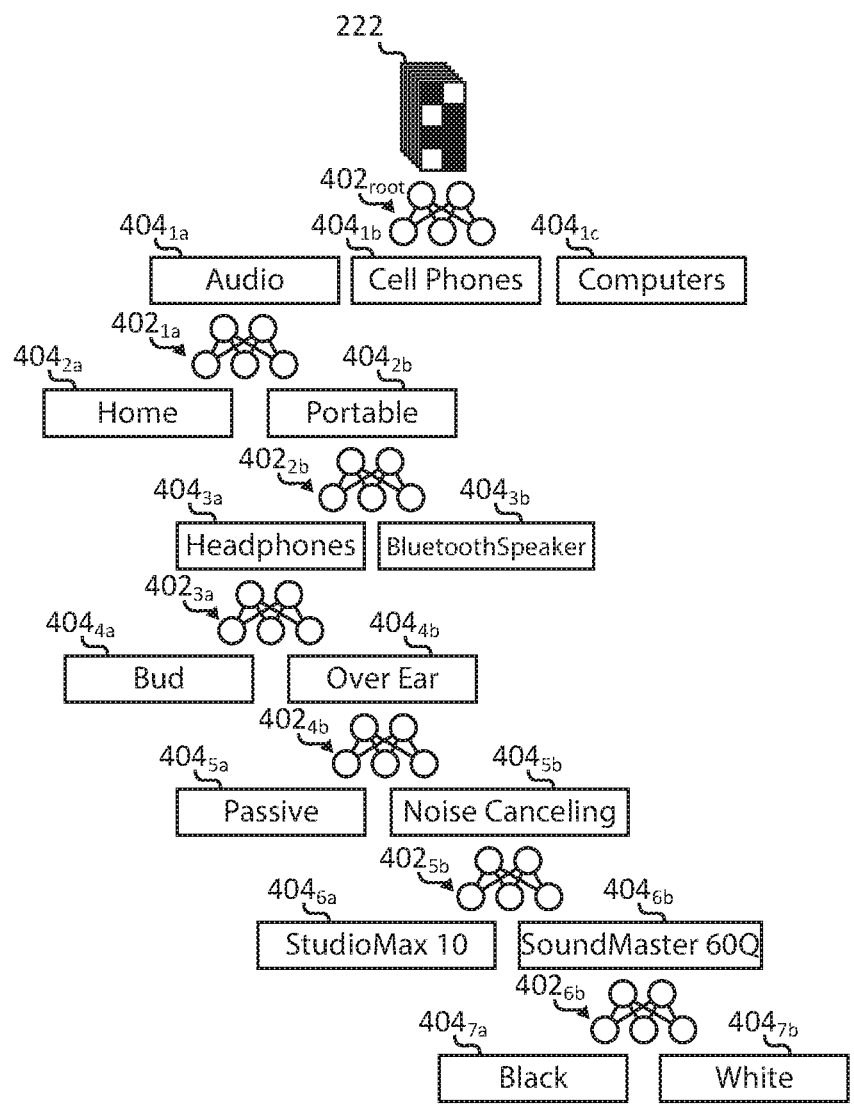
FIG. 4 illustrate an example technique for assigning attributes to a review short code according to some embodiments.

FIG. 4 shows an example technique for assigning attributes to a review short code 222. It should be understood that review short code 222 can be a review short code generated from a product review and product image (e.g., from the marketplace for training purposes) and/or it can be a review short code generated from a review article from a publisher. A marketplace can have a catalog of products organized in a tree structure as exemplified in FIG. 4. For example, the catalog presented can be an electronics catalog having a root node and child nodes "Audio" (attribute $404_{1a}$), "Cell phones" (attribute $404_{1b}$), and "Computers" (attribute $404_{1c}$). "Audio" can then have child nodes "Home" (attribute $404_{2a}$) and "Portable" (attribute $404_{2b}$), and so on. Attributes $404_{ij}$ can correspond to nodes of the tree, where node (i,j) corresponds to the jth node of the ith level. It should be understood that attributes $404_{ij}$, attributes 116, and nodes for the purposes of this description, can all be used interchangeably as appropriate. For convenience, "node" can refer to a location in a data structure and an "attribute" can be a reference to that node.

In order to select between different attributes, sub-Artificial Neural Networks (ANNs) 402 can be utilized. Like assignment network 114, ANN $402_{root}$ can take review short code 222 as an input and assign any of attributes $401_{1a}$, $401_{1b}$, and $401_{1c}$. In FIG. 4, attribute $404_{1a}$ is assigned to the review short code 222. The system can then use ANN $402_{1a}$ to assign any of attributes $404_{2a}$ and $404_{2b}$. Continuing this process, the system can assign attributes $404_{1a}$, $404_{2b}$, $404_{3a}$, $404_{4b}$, $404_{5b}$, $404_{6b}$, and $404_{7b}$ using ANNs $402_{root}$, $402_{1a}$, $402_{2b}$, $402_{3a}$, $402_{4b}$, $402_{5b}$, and $402_{6b}$. In some embodiments, an ANN 402 can determine that multiple attributes apply to a review short code 222, in such embodiments, the system can traverse down the respective multiple aspects of the tree utilize the respective ANN 402, each hop in the tree being traversed using the guidance of an ANN 402. In some embodiments, an ANN 402 can determine that no child attributes apply to the review short code 222 and the traversal can end. This might occur when a review pertains to a certain topic but no specific products or sub-topics.

A system can train the various neural networks 402 by assigning ancestry attributes 404 to product reviews and product images. For example, a product review corresponding to attribute $404_{7a}$ can also be assigned attribute $404_{6b}$, up to attribute $404_{1a}$. This technique is useful in multiple embodiments and is not limited to the tree structure having multiple neural networks as shown in FIG. 4.

In some embodiments, a catalog structure or organization paradigm for a marketplace can imply certain restraints on attributes. For example, in a hierarchical structure, if a product has one attribute (e.g., "blue") then it should not have another attribute (e.g., "red"). The assignment network 114 can make predictions for appropriate attributes and include a validating step which can force the resultant predictions to comply with the organizational paradigms. For example, if two attributes are mutually exclusive, the attribute with the lower score can be replaced with a zero or some other indication that it is not predicted. Alternatively, contradictory predictions can be retained because the review article may pertain to both attributes 116. For example, a review article might discuss the differences between a blue product and a red product. In some embodiments, a sparsity metric can be enforced to limit the number of attributes assigned to an input.

In some embodiments, a child attribute can inherit attributes from its ancestry. For example, even if a review article does not get immediately assigned to a parent attribute, but the system assigns a certain percentage of child attributes to the review, the system can also assign the parent attribute. In some embodiments, when a child attribute is assigned, all parent attributes are also assigned. It should be understood that, for the purposes herein, to "assign" can mean that the assignment network 114 has given a prediction value that an attribute corresponds to an input and the prediction value is above a predetermined amount.

In some embodiments, other structures alterative to a tree structure can be utilized for organizing a catalog. For example, a directed acyclic graph can be utilized (e.g., a tree excepting that the branches can interconnect). This could result in "black SoundMaster 60Q" being located at node $404_{7a}$ as well as being a child node for cell phones (e.g., cell phone accessories). In some embodiments, a graph data structure is not used at all, but a system of labels (or "keywords"). The principles described herein can be applied to predicting the labels appropriate for any review article based on training data from product reviews and product images that are associated with the various labels (e.g., because of a labeled product being reviewed). It is contemplated that a review article can be considered irrelevant, such as if it receives low predictive values for every attribute.

In some embodiments, multiple catalogs can exist on a marketplace. For example, different catalogs for books, movies, electronics, home appliances, etc. Each catalog can be associated with a different assignment network 114. In some embodiments, a review short code can be generated for a review article using autoencoders 110, 106, and 220, the review short code can then be applied to each assignment network for the respective catalogs to determine attributes for the review article. The result can be that the review article can be assigned attributes related to some or all of the catalogs. In some embodiments, a preliminary assessment can determine which catalogs are relevant to the short code (or review article). For example, a pair of headphones might be relevant to a home audio catalog as well as a back-to-school catalog. This preliminary assessment can be performed by a neural network. For example, to train the neural network, a product review can be associated with multiple catalogs and the neural network can be trained to predict which catalogs the product review is associated with. The training process can be repeated for multiple product reviews until the neural network has satisfactory predictive results.

In some embodiments, multiple text autoencoders and/or multiple image autoencoders can be utilized. For example, a catalog for sports can have a corresponding sports text autoencoder while a catalog for electronics can have a corresponding electronics test autoencoder. A review article can be supplied to each catalog system (i.e., autoencoders as well as attribute assignment networks). In some embodiments, an autoencoder provides short codes for multiple assignment networks. If one assignment network is not able to get high quality predictions from the short codes, autoencoders specific to the assignment network can be generated. Training data for those specific autoencoders can be limited to product reviews and product images that are associated with the assignment network (i.e., catalog).

Figure 5:
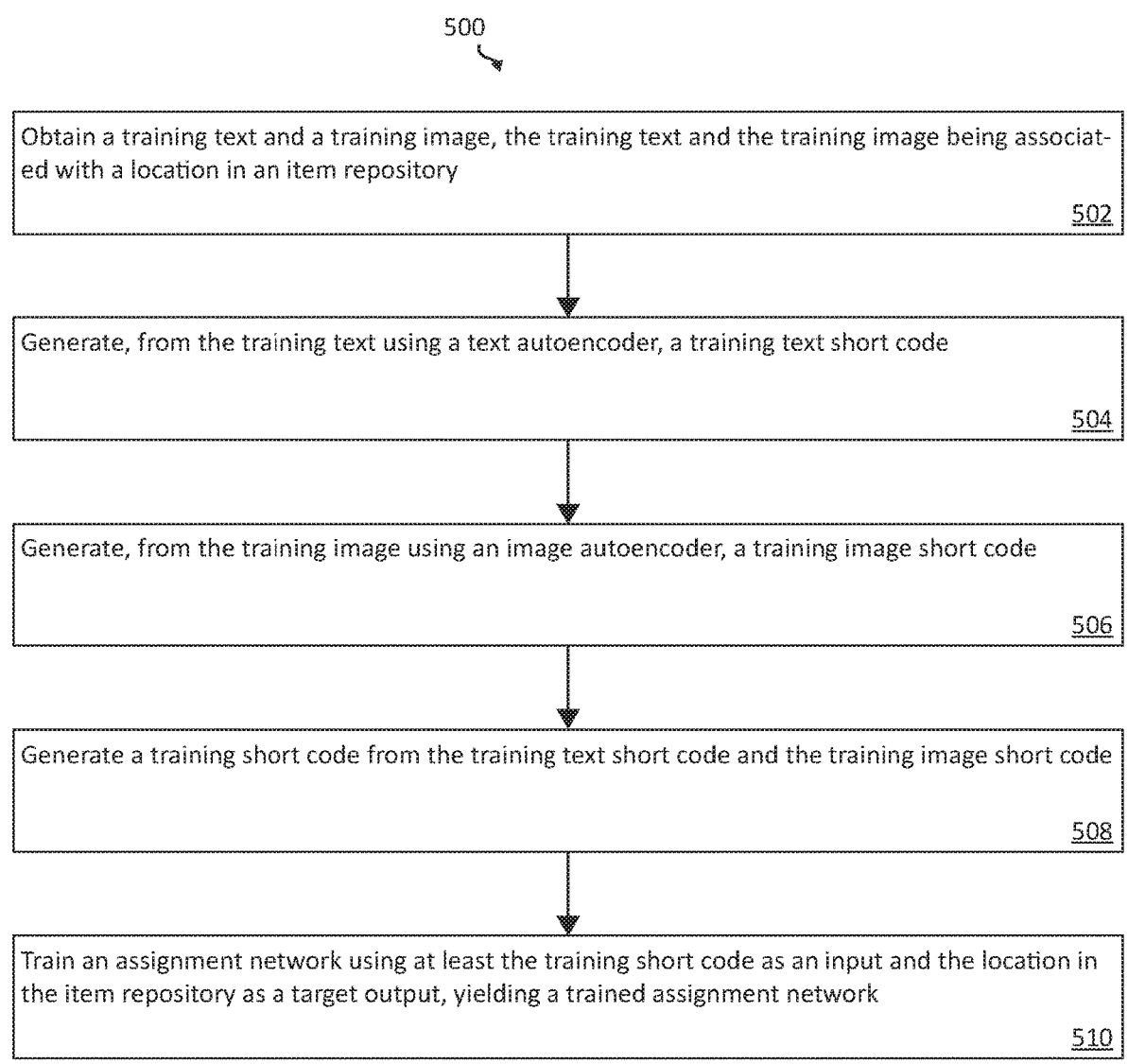
FIG. 5 illustrate an example method for training an attribute assignment system according to some embodiments.

FIG. 5 shows an example method 500 for training an attribute assignment system according to some embodiments. It should be understood that, in example method 500, a "location in an item repository" is a type of attribute. Other attributes can be used with example method 500 in addition to or instead of a location in an item repository. In some embodiments, example method 500 is performed on a first server, such as a server associated with an online marketplace. The online marketplace can provide multiple products for sale; the products can either be sold directly from the marketplace or from third parties. The marketplace can be organized according to various paradigms. For example, the marketplace can be organized using one or more item repositories. The one or more item repositories can each pertain to a specific type of product or item. The item repositories can have a graph structure such as a tree or directed acyclic graph (with one or more root nodes). The leaf nodes of item repository trees can represent different shop keeper numbers (SKUs) such a certain model number and color of a product for sale. Similarly, the end nodes of a directed acyclic graph can represent different SKUs etc. Other nodes can correspond to types and sub-types within an item repository (e.g., locations in a catalog such as "electronics" or "clothing"). In some embodiments, the item repository comprises a database of items and labels associated with those items. For example, a headphone product might have labels for the type and sub-types that the headphone is associated with (e.g., "audio," "portable audio," "Bluetooth®," etc.). Labels can have a hierarchical structure or can have a flat structure. A label can include a product ID, a SKU, a merchant ID, etc.

It should be understood that an "item" can be for a physical or digital item; further, an item can be purchased, rented, borrowed, viewed or otherwise consumed. For example, an item can be an application, a media item such as a movie, a physical product for purchase, a service, etc. An item can be a product.

A system can obtain a training text and a training image, the training text and the training image being associated with a location in an item repository 502. The training text can be a product review on an online marketplace, such as a review supplied by a customer detailing their experience with the product. The training text can be associated with a specific item, product, or SKU. The training text can be associated with one or more attributes such as a label, a location in a catalog, and reviewer profile attributes. In some embodiments, the training text can be a product specification provided by a manufacturer. The training text can be a product description. In some embodiments the training text can be automatically generated from a list of specifications. For example, a system can take data from specifications, determine a set of important data and construct a review of a relevant item from the set of important data using natural language.

The training image can be associated with the training text. For example, a reviewer can supply an image as part of a product review. In some embodiments, the training image is not provided by the author of the training text. In some such embodiments, the training image can be matched with the training text. For example, a system can determine that the training image and the training text are associated with a similar product, item, label, location, or other attribute.

A system can then generate, from the training text using a text autoencoder, a training text short code 504. The text autoencoder can be a stacked long short-term memory (LSTM) autoencoder with a sentence LSTM autoencoding layer, a paragraph LSTM autoencoding layer, and a full text LSTM autoencoding layer. The sentence autoencoding layer can encode words of a sentence to generate a sentence short code; the paragraph autoencoding layer can receive sentence short codes and generate a paragraph short code; the full text autoencoding layer can receive paragraph short codes and generate a full text short code. In some embodiments, only one or two LSTM layers are utilized. For example, a full text LSTM autoencoder can receive sentence short codes and generate a review short code. A short code is a vector of values that includes data describing descriptive features of the input.

A system can generate, from the training image using an image autoencoder, a training image short code 506. The image autoencoder can include a preprocessing step to resize the product image to a standard size such as 256×256 pixels. Preprocessing can include a feature extraction algorithm, image segmentation, and/or an edge detection algorithm. The autoencoder can be a convolutional neural network.

A system can generate a training short code from the training text short code and the training image short code 508. For example, the training text short code can be concatenated with the training short code. Additionally, the concatenated training text short code and training short code can be supplied to a combination autoencoder to generate the training short code. Alternatively, training short code can include the concatenated training text short code and the training image short code (i.e., without being supplied to a combination autoencoder).

While text and images are primarily discussed as example types of content, other types of content are contemplated as well, such as a review score, a title, etc. These other types of content can have respective autoencoders and the resulting short codes can be combined with the training text short code and the training image short code to form the training short code. For example text, images, price, review count, review score, popularity index, title, category, class, target audience, etc. can be joined in any combination to form a training short code. Some types of content can be provided to a respective autoencoder while other types of content can be combined without a respective autoencoder (i.e., with "raw" data).

In some embodiments, the training text is matched with the training image before respective short codes are generated. In some embodiments, the training text is matched with the training images after the respective short codes are generated. A matching system can reuse short codes when matching components, such as when matching a single training text with multiple training images or a single training image with multiple training texts. In such embodiments, a short code need only be generated once but can be reused in each matching. The resultant matchings can have attributes from the constituent components (e.g., just attributes shared between the components or attributes that are found in any of the components). A matching can include more than two components. A matching can include multiple components of the same type of content such as two images or two texts or two reviews.

A system can train an assignment network using at least the training short code as an input and the location in the item repository as a target output, yielding a trained assignment network 510. The assignment network can be a feed forward artificial neural network that receives a short code and then generates attribute assignments for the short code. For example, the assignment network can receive the training short code and generate a vector of how relevant each attribute is predicted to be for the review short code. For example, if there are 1,000 possible attributes, the output vector can include 1,000 values and each value can be a number from 0 to 1 predicting how related the attribute is to the review short code. In some embodiments, some attributes can be mutually exclusive; in some such embodiments, if one of those attributes is higher than the rest of the mutually exclusive attributes, the other attributes can be assigned a prediction of zero. In some embodiments, attributes have relationships such as a child location in an item repository to a parent. The parent attribute can be derived from the child attributes (e.g., a sum, average, min function, max function, or other combination). In some embodiments, when an attribute prediction is above a predetermined amount, then the attribute can be associated with the review short code. Assigning an attribute can mean that the attribute prediction is above a predetermined amount. An attribute can be a location in an item repository, a label of an item repository, a keyword, a product, etc. In some embodiments, a processing step can include analyzing the resultant vector to determine a most likely attribute or set of attributes. In some embodiments, such a processing step can include enforcing internal consistency metrics so that contradictory attributes are not associated with a same review article. For example, a first pass could analyze the resultant vector to determine a most likely main category and discard or set to zero the remaining main categories and related sub categories, with later passes doing the same down an item repository tree or graph.

Training the assignment network can include using multiple training short codes (derived from multiple training texts and images) and adjusting weights of the assignment network so that the assignment network minimizes the error between the predicted attributes and the "actual" attributes associated with the supplied training texts and training images. In some embodiments, the accuracy of a prediction can be a combination of the errors in the resultant vector (e.g., based on a sum or sum of squares), alternatively, the accuracy of a prediction can be based on the error in only the highest (or set of highest) predicted attributes. The assignment network can be trained until an aggregate accuracy (e.g., the average accuracy of predictions) is within a certain predefined range. If the assignment network fails to achieve an acceptable aggregate accuracy, the assignment network can inform the autoencoders to generate short codes of a larger size (i.e., holding more information). The assignment network can request more training data such as more training short codes. To generate more training short codes, more matchings can be created.

In some embodiments, a service or marketplace can be organized into multiple item repository or catalogs; each item repository can have an independent structure and organization, and an item may appear in multiple repositories. In some embodiments, a repository assignment neural network can be trained to determine which repositories are relevant to a short code. After the short code is assigned to various repositories, the short code can be assigned attributes based on a related attribute assignment networks for the respective repositories.

Figure 6:
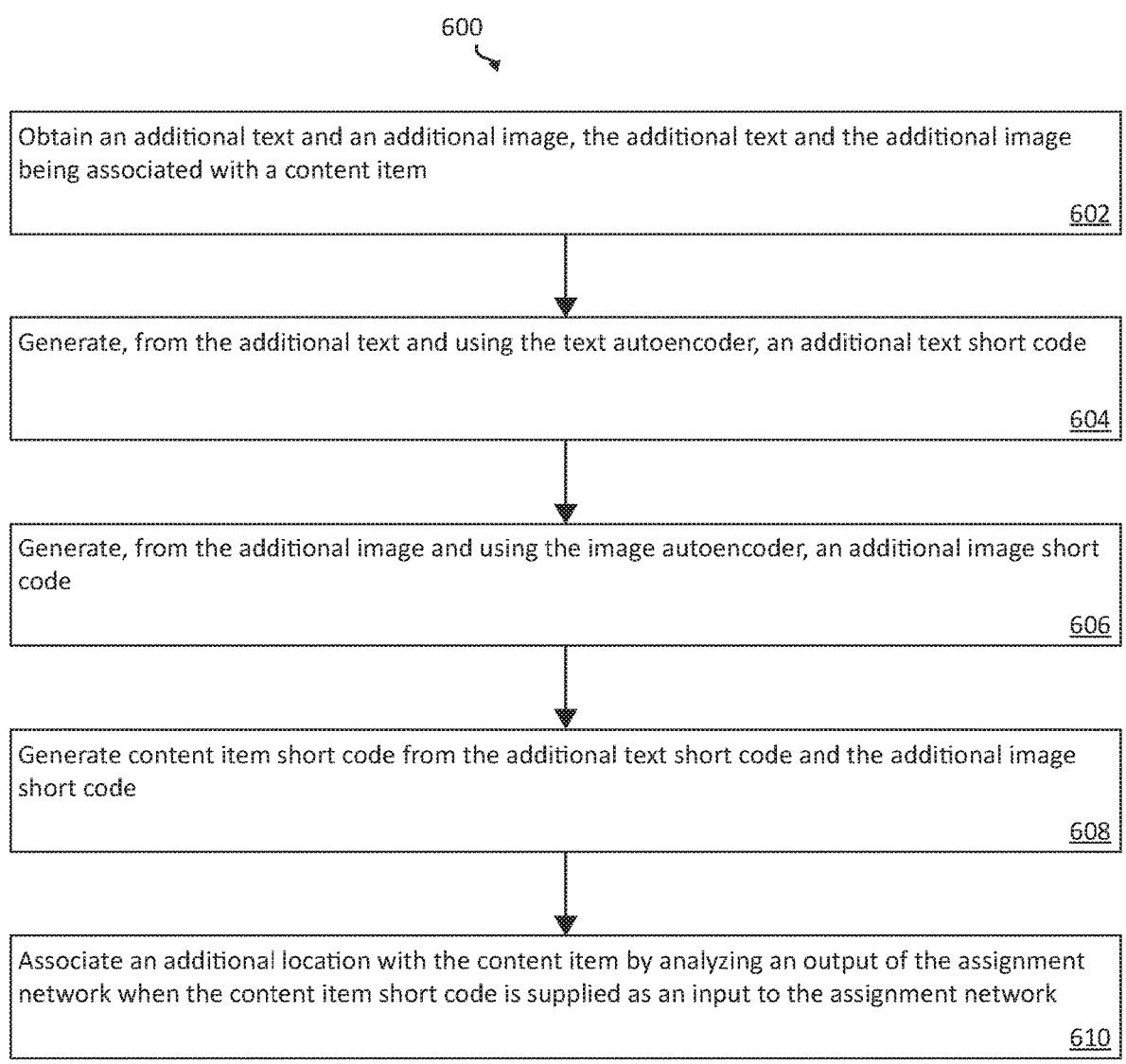
FIG. 6 shows an example method 600 for assigning an attribute to a review article from a review publisher.

FIG. 6 shows an example method 600 for assigning an attribute to a content item from a review publisher. A content item can include text, images, video, audio, and other media. A content item can be related to a specific item (e.g., a review a specific product), to a type of item, a technology relevant to various items, etc. After the various neural networks have been sufficiently trained (e.g., the text autoencoder, the image autoencoder, the combination autoencoder, the assignment network, etc.) a system can obtain an additional text and an additional image, the additional text and the additional image being associated with a content item 602. For example, the content item can be a review article from a separate domain that includes text and at least one image. The separate domain can be a review publisher that is a third party to a first domain such as a marketplace. The review publisher might have an organizational scheme that is different than the marketplace (e.g., different than the item repository). The example method 600 can be useful for mapping the content items with locations in an item repository. For example, example method 600 can be used to map review articles from a review publisher to locations in a catalog on a marketplace so that a customer can, when they are at certain locations, see a references to relevant review articles. The content item does not need to be specific to an item of the item repository. For example, an example review article can be a buying guide for a class of products or any other information that can be useful for a customer looking to make a purchase or learn more.

A system can generate, from the additional text and using the text autoencoder, an additional text short code 604. The additional text can help further train the text autoencoder. For example, a collection of product reviews and review article texts can be aggregated and can train the text autoencoder. A system can also generate, from the additional image and using the image autoencoder, an additional image short code 606. The additional image can also help train the image autoencoder.

A system can generate content item short code from the additional text short code and the additional image short code 608. For example, a review article text short code can be concatenated with the review article image short code. Concatenated short codes can then be provided to a combination autoencoder to generate a content item short code.

A system can then associate a location with the content item by analyzing an output of the assignment network when the content item short code is supplied as an input to the assignment network 610. For example, the assignment network can generate a vector of attribute scores, each attribute score representing a predicted relevance of the content item short code to the respective attribute (e.g., location in a marketplace catalog). The system can then associate the content item with the certain attributes based on the resultant vector (e.g., certain attributes with a prediction score above a predetermined value).

After associating the content item (e.g., a review article) with one or more attributes, a system can provide the content item as a reference when those attributes are requested. For example, if an attribute is a location in a marketplace catalog, when the location is viewed by a customer, then an associated review article can be provided to the customer to assist the customer in making a decision at that point in the catalog. In some embodiments, when a reader is reading the review article (e.g., on a third party publishing platform), attributes associated with the article can be used to generate a link to a related marketplace location. For example, if the review article discusses how to choose the best headphones, a link can be automatically generated to bring the reader to a headphone section of a catalog on the marketplace.

It should be understood that example method 500 includes some techniques for training and supplying inputs to autoencoders and other neural networks. The principles of example method 500 can be used to utilize such autoencoders and neural networks for predicting values using content items as inputs. It should be understood that the training data can be from a first server on a first domain (e.g., product reviews and product images) while content items can be from a second server on a second domain (e.g., review articles from a content publisher).

Figure 7:
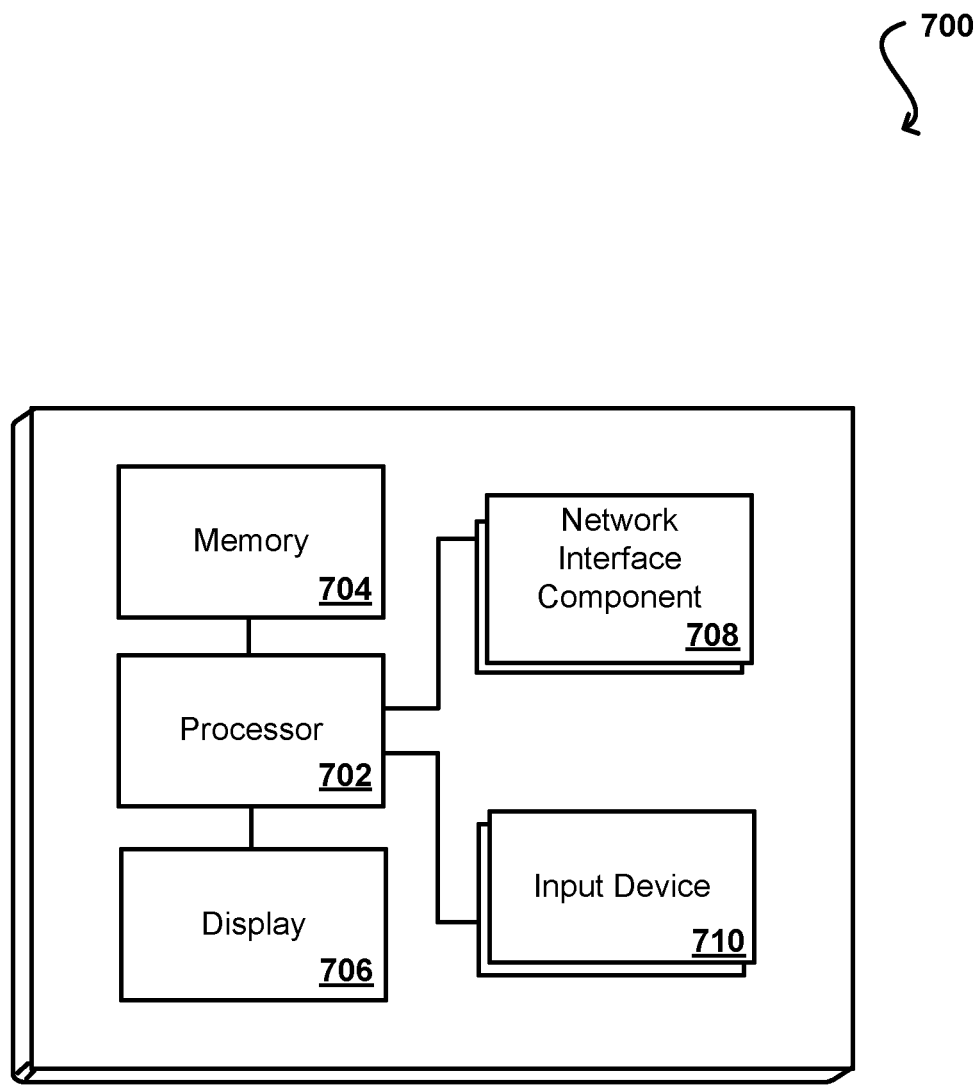
FIG. 7 illustrates example components of a computing device that can be utilized in accordance with various embodiments.

FIG. 7 illustrates a logical arrangement of a set of general components of an example computing device 700 that can be used to implement aspects of the various embodiments. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one input element 710 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 7 can include one or more network interface components 708 for communicating over various networks, such as a Wi-Fi, Bluetooth, RF, wired, or wireless communication systems. The device in many embodiments can communicate with a network, such as the Internet, and may be able to communicate with other such devices.

Figure 8:
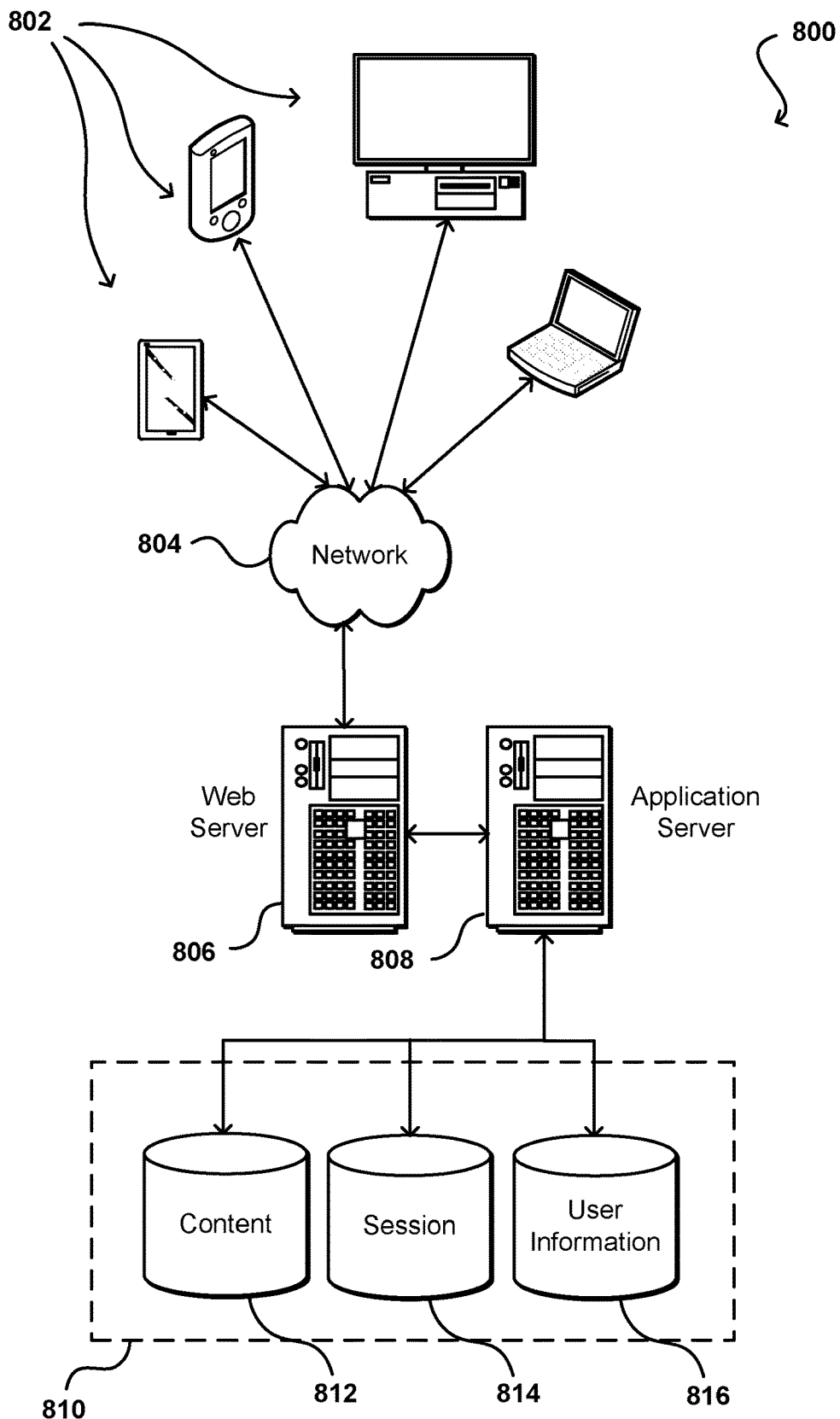
FIG. 8 illustrates an example environment in which aspects of the various embodiments can be implemented.

As discussed, different approaches can be implemented in various environments in accordance with the described embodiments. For example, FIG. 8 illustrates an example of an environment 800 for implementing aspects in accordance with various embodiments, such as to obtain content to be rendered by a 3D or VR headset, or other such device or display. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. This can include, for example, image information captured for the face of a user or a request for virtual reality content to be rendered on a virtual reality headset or other such device. Examples of client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for training a location assignment system, comprising:
    obtaining, from an entity that provides a plurality of products, training content including at least product reviews and product images associated with the plurality of products;
    generating product review short codes by supplying the product reviews to a text autoencoder;
    generating product image short codes by supplying the product images to the image autoencoder;
    combining, for individual products of the plurality of products, the product review short codes and the product image short codes to form training short codes;
    training an assignment network using the training short codes as inputs and related marketplace item repository locations as target outputs, the related marketplace item repository locations associated with at least one of the plurality of products;
    obtaining articles from a review publisher, the articles having article text portions and article images;
    determining one or more locations in an item repository for the articles using the text autoencoder, the image autoencoder, and the assignment network; and
    storing a mapping of the one or more locations to the articles from which the articles are accessible.

2. The computer-implemented method of claim 1, further comprising:
    receiving a request at the marketplace for information associated with an item repository location of the one or more locations;
    determine, using on the mapping, that the item repository location maps to an article; and
    return information for the article.

3. The computer-implemented method of claim 1, wherein the text autoencoder is a stacked long short-term memory (LSTM) autoencoder with a sentence autoencoding layer, a paragraph autoencoding layer, and a review text autoencoding layer.

4. A computer-implemented method, comprising:
    obtaining a training text and a training image, the training text and the training image being associated with a location in an item repository;
    generating, from the training text and using a text autoencoder, a training text short code;
    generating, from the training image and using an image autoencoder, a training image short code;
    generating a training short code from the training text short code and the training short code;
    training an assignment network using at least the training short code as an input and the location as a target output, yielding a trained assignment network;
    obtaining an additional text and an additional image, the additional text and the additional image being associated with a content item;
    processing the additional text and the additional image using the text autoencoder, the image autoencoder, and the trained assignment network to determine an additional location in the item repository; and
    associate the additional location to the content item.

5. The computer-implemented method of claim 4, further comprising:
    receiving a request for information associated with the additional location in the item repository; and
    providing, in response to the request, information for the content item.

6. The computer-implemented method of claim 5, wherein the training text, the training image, and item repository are associated with a first domain and the content item is associated with a second domain.

7. The computer-implemented method of claim 4, further comprising:
    receiving a request for the content item; and
    providing, in response to the request, a reference to the additional location in the item repository.

8. The computer-implemented method of claim 4, wherein generating a training short code comprises using a combination autoencoder.

9. The computer-implemented method of claim 4, further comprising:
    processing a content item short code for the content item using a second trained assignment network for a second repository to determine a second additional location on the second repository; and
    associating the second additional location with the content item.

10. The computer-implemented method of claim 4, further comprising:
    obtaining a second content item;
    determining that the second content item comprises a first portion and a second portion, the first portion having a first portion text and a first portion image, and the second article portion having a second portion text and a second portion image;
    processing the first portion text and the first portion image using the text autoencoder, the image autoencoder, and the trained assignment network to determine a first portion location in the item repository;
    processing the second portion text and the second portion image using the text autoencoder, the image autoencoder, and the trained assignment network to determine a second portion location in the item repository; and
    associating the first portion location and the second portion location with the second content item.

11. The computer-implemented method of claim 4, wherein the text autoencoder includes a text convolutional autoencoder or a stacked long short-term memory (LSTM) autoencoder with a sentence autoencoding layer, a paragraph autoencoding layer, and a full text autoencoding layer.

12. The computer-implemented method of claim 4, wherein the image autoencoder is a convolutional autoencoder, the method further comprising resizing the training image to create a resized training image and providing the resized product image as an input to the image autoencoder.

13. The computer-implemented method of claim 4, further comprising:
    determining that the location for the item repository needs more training data;
    selecting a second training text and a second training image, wherein the second training text and the second training image are for different items that are associated with the location; and further training the assignment network using a second training short code generated from the second training text and the second training image.

14. A system, comprising:

at least one processor; and memory including instructions that, when executed by the at least one processor, cause the system to:

obtain a training text and a training image, the training text and the training image being associated with one or more labels of an item repository;

generate, from the training text using a text autoencoder, a training text short code;

generate, from the training image using an image autoencoder, a training image short code;

generate a training short code from the training text short code and the training image short code;

train an assignment network using at least the training short code as an input and the one or more labels of a catalog as a target output, yielding a trained assignment network;

obtain an additional text and an additional image, the additional text and the additional image being associated with a content item;

processing the additional text and the additional image using the text autoencoder, the image autoencoder, and the trained assignment network to determine at least one label of the item repository; and associate the at least one label to the content item.

15. The system of claim 14, wherein the instructions when executed further cause the system to:

receive a request for information associated with the at least one label of the item repository; and provide, in response to the request, information for the content item.

16. The system of claim 15, wherein the training text, the training image, and the item repository are associated with a first domain and the content item is associated with a second domain.

17. The system of claim 14, wherein the instructions when executed further cause the system to:

receive a request for information associated with the content item; and provide, in response to the request, information associated with the at least one label of the item repository.

18. The system of claim 14, wherein the instructions that, when executed, cause the system to generate a training short code, include instructions to use the combination autoencoder.

19. The system of claim 14, wherein the text autoencoder is a stacked long short-term memory (LSTM) autoencoder with a sentence autoencoding layer, a paragraph autoencoding layer, and a full text autoencoding layer.

20. The system of claim 14, wherein the instructions when executed further cause the system to:

determine that the at least one label of the item repository needs more training data;

selecting a second training text and a second training image, wherein the second training text and the second training image are for different items that are associated with the at least one label; and training the assignment network using a second training short code generated from the second training review text and the second training image.

\* \* \* \* \*